(No Model.)

G. L. DALE.
AUTOMATIC EGG BOILER.

No. 328,110. Patented Oct. 13, 1885.

Witnesses
R. J. Daniels
Louis A. Roth

Inventor
George L. Dale
By P. H. Gunckel
Attorney

UNITED STATES PATENT OFFICE.

GEORGE L. DALE, OF MINNEAPOLIS, MINNESOTA, ASSIGNOR TO HARRIETTE B. DALE, OF SAME PLACE.

AUTOMATIC EGG-BOILER.

SPECIFICATION forming part of Letters Patent No. 328,110, dated October 13, 1885.

Application filed September 1, 1884. Serial No. 141,995. (No model.)

*To all whom it may concern:*

Be it known that I, GEORGE L. DALE, a citizen of the United States, residing at Minneapolis, in the county of Hennepin and State of Minnesota, have invented a certain new and useful Improvement in Automatic Egg-Boilers; and I hereby declare that the following is a full, clear, and exact description thereof, reference being had to the accompanying drawings.

My invention relates to egg-boilers operating automatically to lift the eggs above the water at a predetermined time; and my invention consists, generally, of a light frame-work supporting a spring-actuated egg-holding sliding frame and an interior vessel perforated at its bottom for the admission of water, and within said vessel a float bearing a pin which projects above the vessel and performs the function of releasing the lever-latches, which hold down the egg-supporting frame, by means of the lifting force of the water admitted at the bottom of the vessel.

Figure 1:
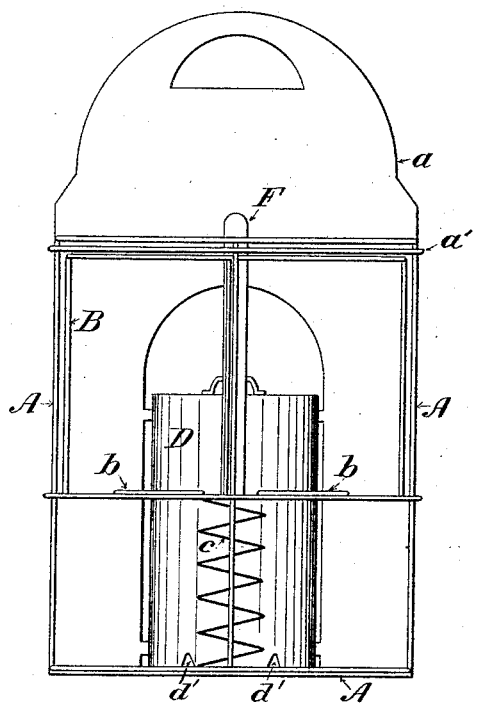
Figure 2:
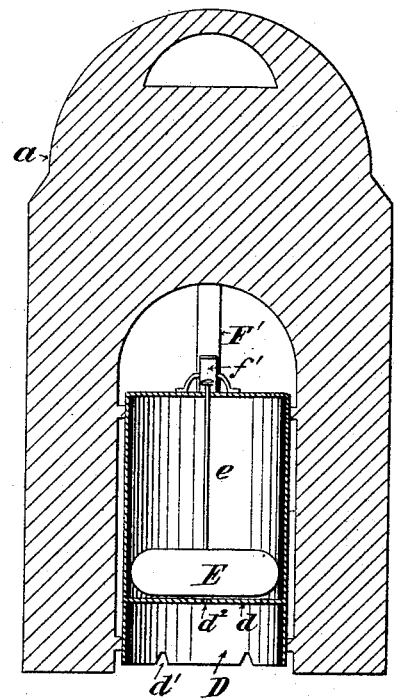
Figure 3:
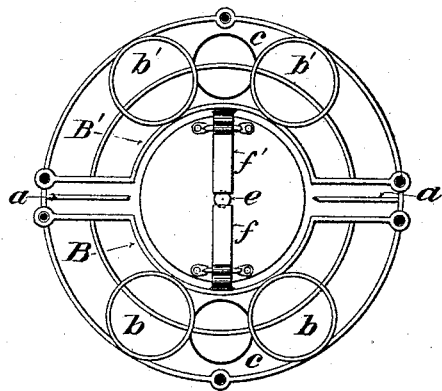
Figure 4:
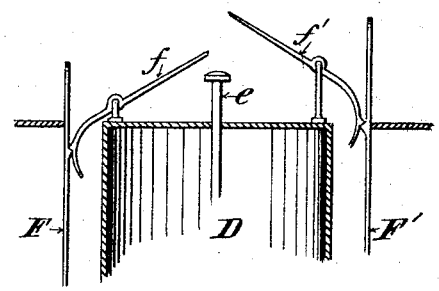

In the drawings, Figure 1 is an elevation of the utensil; Fig. 2, a vertical sectional view of the same; Fig. 3, a top view with the top plate or cover removed; and Fig. 4, a detail of the lever-latches.

A is a frame-work, which may be of wire and made in circular form.

$a$ is a tin or other partition between the two sliding frames, and is made to project a suitable distance above the frame-work to serve as a handle to the utensil. This partition may be dispensed with and a wire or other handle provided at the top. $a'$ is a top or cover, which, when fitting closely within or on the vessel in which the utensil is placed, serves, measurably, to prevent the escape of steam and heat; but this cover may also be dispensed with, if desired.

B B' are semicircular wire frames sliding on the posts of the frame-work A. $b$ and $b'$ are the egg-holders secured to the sliding frames B B'. $c c$ are spiral springs attached to the sliding frames B B' and to the bottom of the frame A, and perform the function of lifting the frames B B' when the latches which hold these frames down are released.

D is a hollow vessel, shown in the drawings as of cylindrical form, but which may be of any other suitable form, and is preferably secured at the center of the utensil and at or near its bottom. $d$ is the bottom of the vessel D, and may be secured a little above the end of the vessel D when the end of that vessel is placed at or near near the bottom frame-work, A. $d'$ are slots or holes cut in the vessel below the vessel's bottom for the free admission of water when the vessel is set near the lower frame-work.

The vessel D may be set higher relatively to the bottom of the frame A, in which case the bottom $d$ may be at the lower end of the vessel D.

E is any suitable float within the vessel D, and has a pin, $e$, attached to it and extending a half-inch or more above the top of the vessel D, for the purpose of lifting the lever-latches, as hereinafter stated.

F F' are upright strips, provided on the frames B B' for engagement with the latches $f f'$, by which means the sliding frames are held down when forcibly depressed. $f f'$ are latches pivoted at the top of the vessel D, and have each an arm extending centrally over the top of the pin $e$. These latches may be of any well-known construction adapted to engage and hold down the sliding frames when depressed, and of releasing the engagement with said frames when by means of the lifting force of the water under the float E the latch-arms are lifted. The form of latch shown is only intended to illustrate one practical form of that element of the invention. One of the latches, $f'$, may be pivoted a little higher relatively to the top of the vessel D than the other, and by this means arranged to be released from engagement with the egg-lifting frame B' the desired interval of time later than the latch $f$ is released.

$d^2$ is a hole (or more smaller holes may be provided, if desired) in the bottom $d$ of the vessel D for the slow admission of water into the vessel when the latter is submerged. The size of the hole $d^2$ (or holes, if more are provided) together with the form of the latches $f f'$ regulate the time required to elapse before the water-pressure under the float E has been sufficient to lift the latches out of engagement. Thus, by a very little experiment, it may be determined what size of water-inlet is required at the bottom $d$ of the latch D to cause the latch $f$ to be forced out of engagement in a desired interval of time—say three minutes—and so with the more elevated latch $f'$ if it be desired that the egg-frame B' be held down, for instance, until the expiration of four minutes. The same result may be reached without varying the size of the water-inlet $d'$ by a variation or different construction of the lever-latches $f f'$.

In constructing the utensil by experiment, to a slight extent, it is determined what size of water-inlet $d'$ is required to cause the latches to be released at the desired times. This is quickly done by first providing a hole of, say, one thirty-second of an inch in diameter, and, if found too small, gradually increasing it until the exact desired size is reached.

In using the utensil eggs are placed in the receptacles $b\ b'$, &c., according to the length of the time it is desired to have them boiled, and the sliding frames B B', &c., are pressed down until engaged and held by the latches $f f'$, when the utensil is placed in hot water in a vessel on the stove. At the expiration of the desired intervals of time the sliding frames are forced up, lifting the eggs in that compartment above the water.

Having fully described my invention, what I desire to claim and secure by Letters Patent is—

The combination, with the frame A and spring-actuated frames B B', of the vessel D, provided with float E, bearing pin $e$, and the latches $f f'$, constructed and arranged substantially as and for the purposes set forth.

GEORGE L. DALE.

Witnesses:
J. W. HUTCHINSON,
W. A. FORBES.